United States Patent
Peng et al.

(10) Patent No.: US 11,503,217 B2
(45) Date of Patent: Nov. 15, 2022

(54) SYSTEM AND METHOD OF ESTIMATING AMBIENT LIGHT

(71) Applicant: Himax Imaging Limited, Tainan (TW)

(72) Inventors: Yuan-Chih Peng, Tainan (TW); Po-Chang Chen, Tainan (TW); Yi-I Lu, Tainan (TW)

(73) Assignee: Himax Imaging Limited, Tainan (TW)

( * ) Notice: Subject to any disclaimer, the term of this patent is extended or adjusted under 35 U.S.C. 154(b) by 260 days.

(21) Appl. No.: 16/871,818

(22) Filed: May 11, 2020

(65) Prior Publication Data

US 2021/0352200 A1 Nov. 11, 2021

(51) Int. Cl.
*H04N 5/235* (2006.01)
*G06T 7/20* (2017.01)
*G06T 7/80* (2017.01)
*G06V 10/25* (2022.01)
*G06V 10/60* (2022.01)

(52) U.S. Cl.
CPC ............. *H04N 5/2351* (2013.01); *G06T 7/20* (2013.01); *G06T 7/80* (2017.01); *G06V 10/25* (2022.01); *G06V 10/60* (2022.01); *H04N 5/2354* (2013.01); *G06T 2207/30264* (2013.01); *G06V 2201/08* (2022.01)

(58) Field of Classification Search
CPC ............... H04N 5/2351; H04N 5/2354; H04N 5/23218; G06T 7/20; G06T 7/80; G06T 2207/30264; G06V 10/25; G06V 10/60
See application file for complete search history.

(56) References Cited

U.S. PATENT DOCUMENTS 10,586,351 B1 * 3/2020 Brailovskiy ............... G06T 7/90

* cited by examiner

*Primary Examiner* — Twyler L Haskins
*Assistant Examiner* — Angel L Garces-Rivera
(74) *Attorney, Agent, or Firm* — Donald E. Stout; Stout, Uxa & Buyan, LLP

(57) ABSTRACT

A system of estimating ambient light includes an image sensor that captures an image; a region of interest (ROI) selector that determines at least one ROI on the image; an occupancy detector that determines existence status of an object disposed on the at least one ROI; and an ambient light estimator that estimates illumination of ambient light of the at least one ROI according to luminance of the at least one ROI on the image.

19 Claims, 5 Drawing Sheets

SYSTEM AND METHOD OF ESTIMATING AMBIENT LIGHT

BACKGROUND OF THE INVENTION

1. Field of the Invention

The present invention generally relates to lighting, and more particularly to a system and method of estimating ambient light.

2. Description of Related Art

A smart parking lot with occupancy sensors may greatly facilitate convenience to drivers. However, artificial lighting set up in the conventional parking lots is either adjusted manually or regulated automatically based on fixed timing that is planned beforehand. Therefore, consumption of energy cannot be greatly reduced, and the artificial lighting cannot be flexibly adjusted according to presence and absence of vehicles in the parking lot.

Although some parking lots are equipped with ambient light sensors, which actually sense the amount of light reflected from vehicles rather than real ambient light present in the parking space. For example, the ambient light sensor erroneously senses large amount of reflected light from a white color vehicle, but erroneously senses small amount of reflected light from a black color vehicle even the ambient lighting is kept the same.

A need has thus arisen to propose a novel scheme to overcome drawbacks of the conventional parking lots.

SUMMARY OF THE INVENTION

In view of the foregoing, it is an object of the embodiment of the present invention to provide a system and method of estimating ambient light adaptable to parking lot lighting capable of substantially conserving energy and effectively enhancing driving and personal safety.

According to one embodiment, the system of estimating ambient light includes an image sensor, a region of interest (ROI) selector, an occupancy detector and an ambient light estimator. The image sensor captures an image. The ROI selector determines at least one ROI on the image. The occupancy detector determines existence status of an object disposed on the at least one ROI. The ambient light estimator estimates illumination of ambient light of the at least one ROI according to luminance of the at least one ROI on the image.

DETAILED DESCRIPTION OF THE INVENTION

Figure 1A:
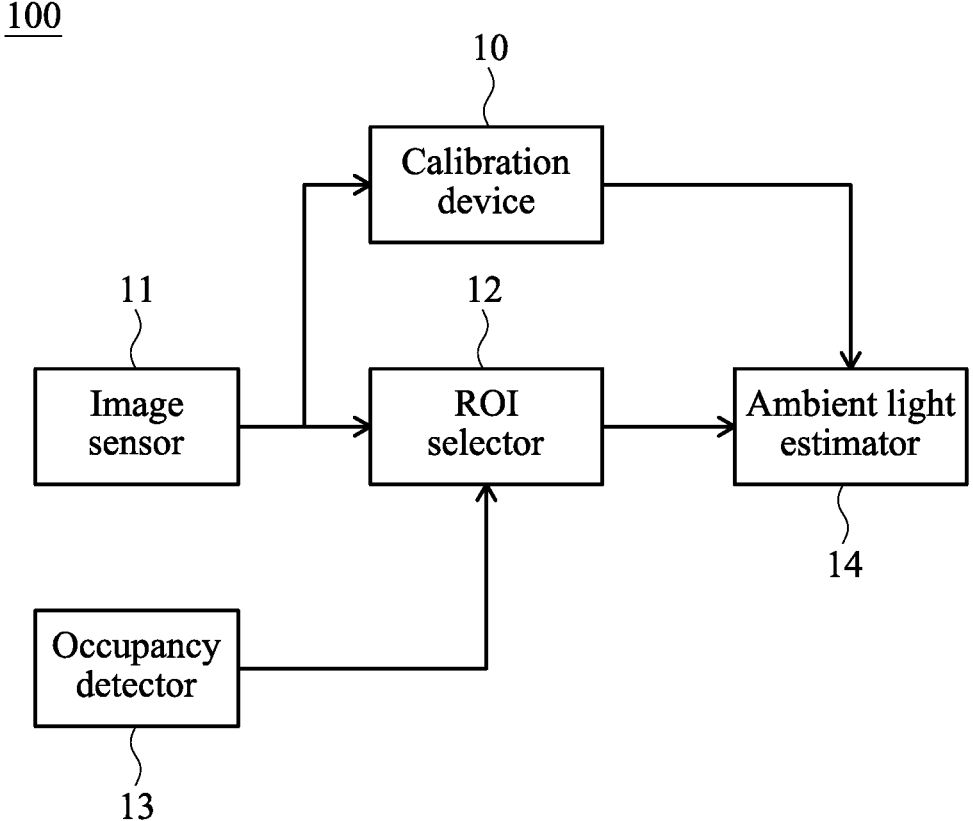
FIG. 1A shows a block diagram illustrating a system of estimating ambient light adaptable to parking lot lighting according to one embodiment of the present invention.

FIG. 1A shows a block diagram illustrating a system 100 of estimating ambient light adaptable to parking lot lighting according to one embodiment of the present invention. Although parking lot lighting is exemplified in the embodiment, it is appreciated that the system 100 may be adaptable to other applications as well.

In the embodiment, the system 100 may include an image sensor 11 with a field of view (FOV) configured to capture an image of multiple (contiguous) parking spaces in a parking lot (or garage). In a preferred embodiment, the image sensor 11 may be a visible-light image sensor such as RGB (red, green, blue) image sensor or monochrome image sensor. The system 100 may include a region of interest (ROI) selector 12 configured to determine at least one ROI (i.e., parking space) on the image.

Figure 2:
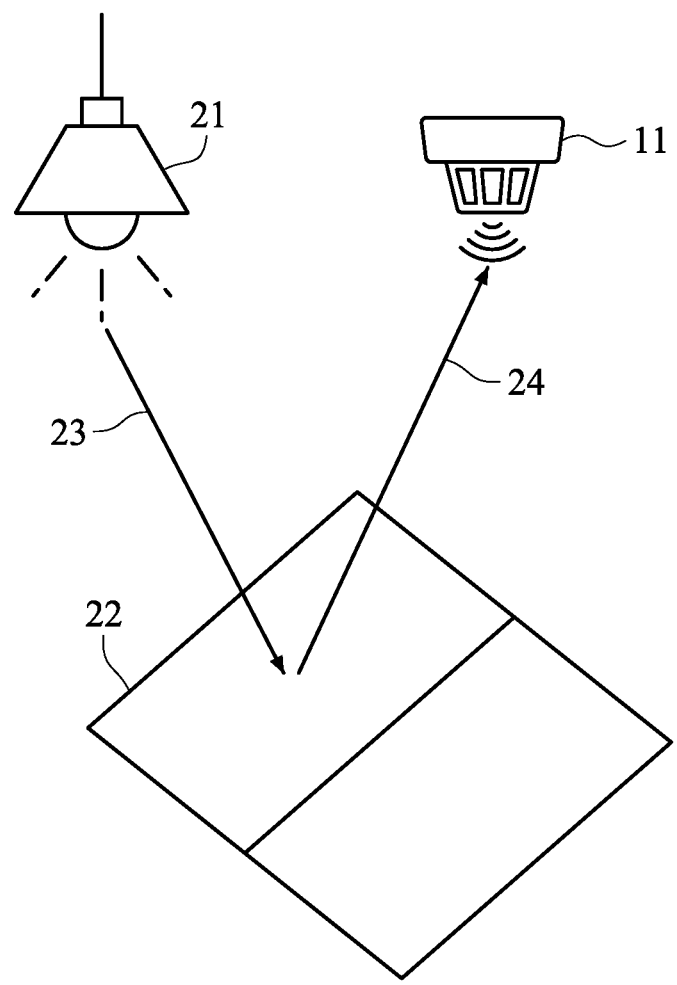
FIG. 2 exemplifies an image sensor and a light source disposed above two parking spaces in a parking lot.

FIG. 2 exemplifies an image sensor 11 and a light source 21 disposed above two parking spaces 22 in a parking lot (or garage). Incoming light 23 (or ambient light) from the light source 21 may irradiate a surface of the parking space 22. Some of the incoming light 23 may be reflected (as reflected light 24) by the parking space 22 and captured by the image sensor 11, while other of the incoming light 23 may be absorbed by the parking space 22. Illumination of the reflected light 24, relative luminance of the captured image, exposure time and gain of the image sensor 11 and reflectance of the parking space 22 have the following relationships (1)-(2):

$$\text{reflected light} \propto (\text{relative luminance})/((\text{exposure time}) \times (\text{gain})) \quad (1)$$

$$\text{reflected light} \propto (\text{incoming light}) \times (\text{reflectance}) \quad (2)$$

where $\propto$ denotes "proportional to."

Accordingly, illumination of the incoming light 23 may be expressed by the following formula (3):

$$\text{incoming light} = K \times (\text{relative luminance})/((\text{exposure time}) \times (\text{gain}) \times (\text{reflectance})) \quad (3)$$

where K is a proportionality constant.

Figure 3:
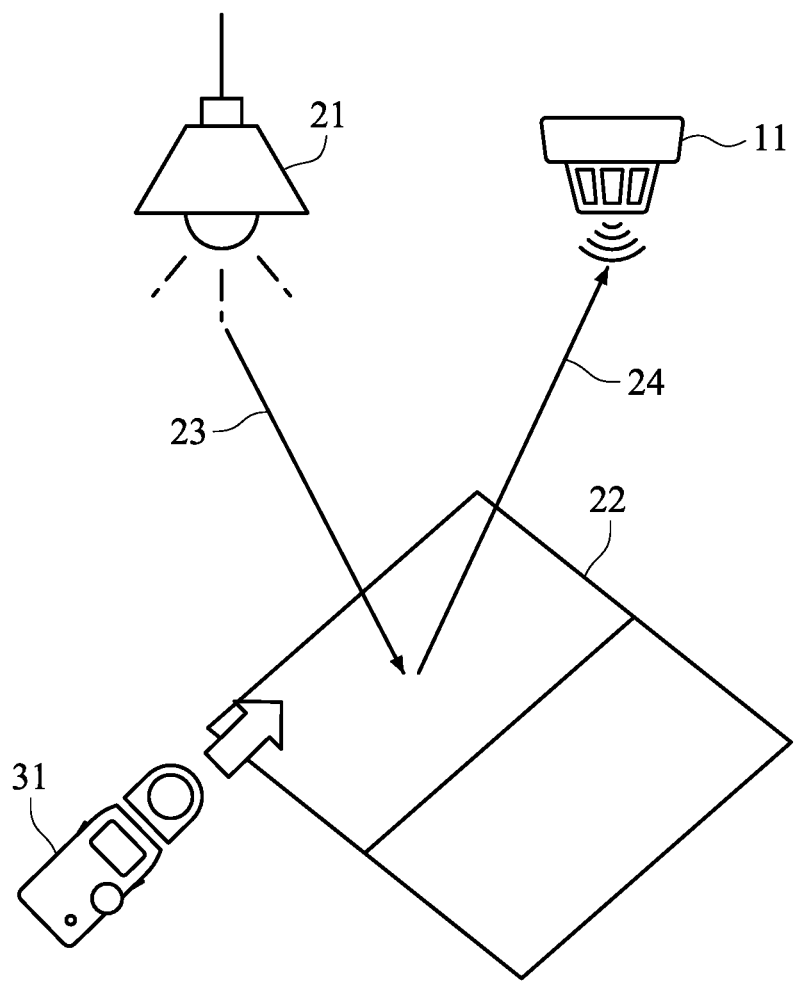
FIG. 3 schematically shows a setup including the image sensor, the light source and a light meter disposed above the vacant parking space for determining the proportionality constant.

The system 100 of the embodiment may include a calibration device 10 coupled to receive an image of a vacant parking space 22 captured by the image sensor 11, and configured to determine the proportionality constant K. FIG. 3 schematically shows a setup including the image sensor 11, the light source 21 and a light meter 31 disposed above the vacant parking space 22 for determining the proportionality constant K. The light meter 31 may measure illumination of the incoming light 23. The proportionality constant K may be obtained from formula (3) given relative luminance of the captured image, exposure time and gain of the image sensor 11 and reflectance of the (vacant) parking space 22. In another embodiment, (K/reflectance) is determined if the reflectance of the (vacant) parking space 22 is not given.

Figure 1B:
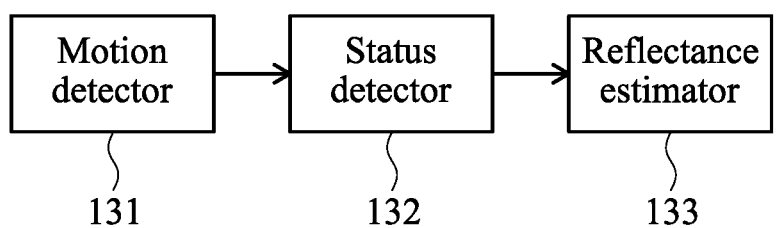
FIG. 1B shows a detailed block diagram illustrating the occupancy detector of FIG. 1A.

The system 100 of the embodiment may include an occupancy detector 13 configured to determine existence status of an object disposed on the at least one ROI. In the embodiment, as shown in a detailed block diagram of the occupancy detector 13 in FIG. 1B, the occupancy detector 13 may include a motion detector 131 configured to detect a moving vehicle. In one embodiment, the motion detector 131 may detect a moving vehicle by comparing a current image and a preceding image (both captured by the image sensor 11). A moving vehicle is detected when a difference between the current image and the preceding image is greater than a predetermined threshold. In the embodiment, the motion detector 131 may perform motion detection on images captured by the image sensor 11. In an alternative embodiment, a passive infrared (PIR) sensor or ultrasonic sensor (not shown) may be used to detect a moving vehicle.

The occupancy detector 13 of the embodiment may include a status detector 132 triggered by the motion detector 131, and configured to determine existence status (i.e., vacancy or occupancy) of a parking space 22. The status detector 132 may execute detection by performing image processing on the image captured by the image sensor 11. In one embodiment, the status detector 132 may adopt feature-based object detection such as histogram of oriented gradient (HOG) or scale-invariant feature transformation (SIFT). In another embodiment, the status detector 132 may adopt neural network such as convolutional neural network (CNN). In an alternative embodiment, the status detector 132 may adopt non-visual-based detection such as ultrasonic distance measurement or earth induction.

In the embodiment, the occupancy detector 13 may include a reflectance estimator 133 configured to estimate reflectance of an occupied parking space 22 as detected by the status detector 132. Specifically, as seen from formula (3), a ratio of the relative luminance to the reflectance for the vacant parking space should be equal to a ratio of the relative luminance to the reflectance for the occupied parking space as expressed by the following formula (4), provided that the incoming light of the light source 21 and exposure time and gain of the image sensor 11 are kept the same:

$$(\text{relative luminance/reflectance})_{vacant} = (\text{relative luminance/reflectance})_{occupied} \quad (4)$$

Accordingly, the reflectance of the occupied parking space may then be estimated according to the relative luminance of the vacant parking space, the relative luminance of the occupied parking space and the reflectance of the vacant parking space.

Figure 4:
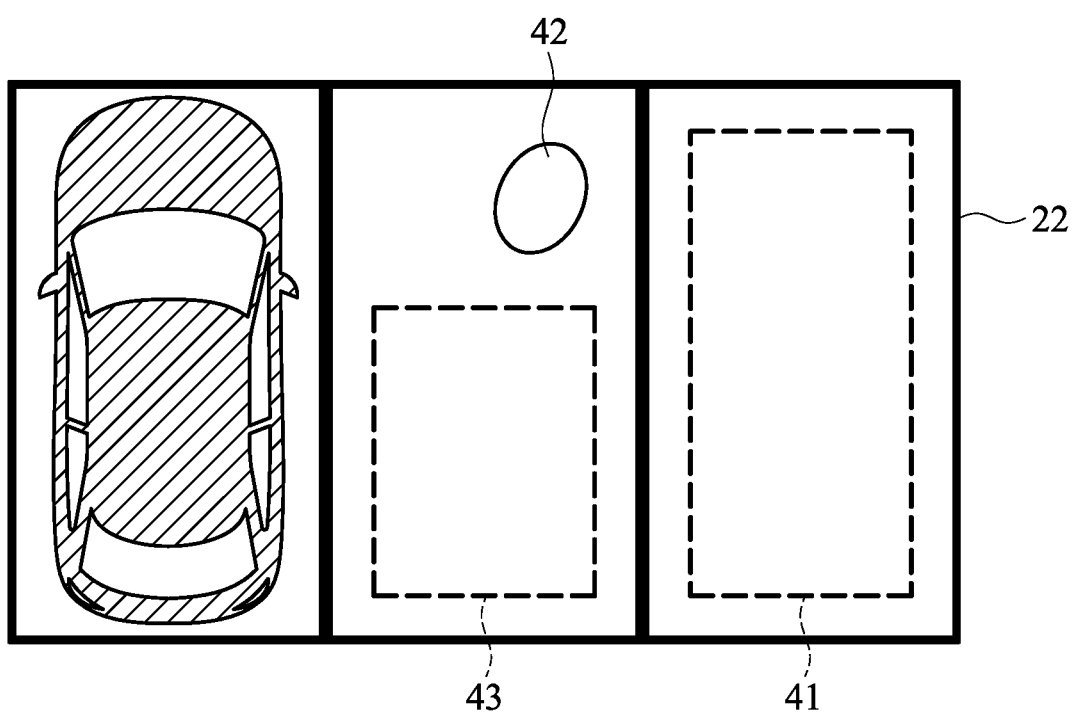
FIG. 4 shows an example of estimating ambient light in an estimate range within each parking space.

In the embodiment, the system 100 may include an ambient light estimator 14 coupled to receive the image captured by the image sensor 11, and configured to estimate illumination of ambient light (or incoming light 23) of the at least one ROI (i.e., vacant or occupied parking space 22) according to luminance of the at least one ROI on the image. As seen from formula (3), the illumination of ambient light (or incoming light) may be estimated according to the relative luminance of the captured image, the exposure time and gain of the image sensor 11 and the reflectance of (vacant or occupied) parking space. FIG. 4 shows an example of estimating ambient light in an estimate range 41 as denoted by dashed line within each parking space 22. In one embodiment, a specular reflection area 42 having luminance value greater than a predetermined threshold may be excluded while estimating ambient light. Therefore, as exemplified in FIG. 4, a reduced estimate range 43 may be used instead. In another embodiment, the specular reflection area 42 may be eliminated, for example, by using a median filter performed on the captured image.

Figure 5:
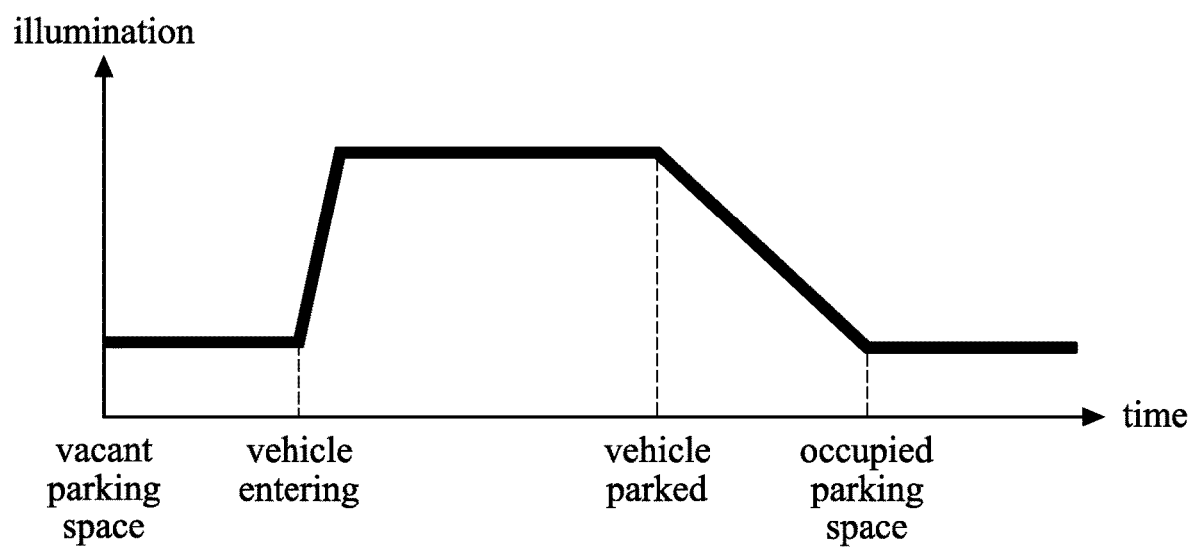
FIG. 5 shows a timing diagram illustrating illumination of exemplary artificial lighting in a parking lot.

According to the embodiment disclosed above, artificial lighting set up in the parking lot (or garage) may be adjusted according to the estimated ambient light. For example, if the estimated ambient light is large, the artificial lighting may be reduced to conserve energy; and if the estimated ambient light is small, the artificial lighting may be increased to enhance driving and personal safety. Moreover, small estimated ambient light may probably indicate aged or failed artificial lighting, which need be promptly fixed. FIG. 5 shows a timing diagram illustrating illumination of exemplary artificial lighting in a parking lot (or garage). Specifically, the illumination of the artificial lighting is adjusted according to the estimated ambient light before a vehicle enters. Upon detecting a vehicle is entering (e.g., by the motion detector 131 and the status detector 132), the illumination of the artificial lighting is increased to enhance driving safety. After the vehicle parks properly, the illumination of the artificial lighting is decreased to the former level to conserve energy.

Although specific embodiments have been illustrated and described, it will be appreciated by those skilled in the art that various modifications may be made without departing from the scope of the present invention, which is intended to be limited solely by the appended claims.

What is claimed is:

1. A system of estimating ambient light, comprising:
   an image sensor that captures an image;
   a region of interest (ROI) selector that determines at least one ROI on the image;
   an occupancy detector that determines existence status of an object disposed on the at least one ROI; and
   an ambient light estimator that estimates illumination of ambient light of the at least one ROI according to luminance of the at least one ROI on the image;
   wherein the occupancy detector comprises a status detector that determines the existence status of the ROI when motion of the object is detected.

2. The system of claim 1, wherein illumination of ambient light irradiating the object is a function of relative luminance of the image, exposure time and gain of the image sensor and reflectance of the ROI with or without the object, and is expressed as follows:

$$\text{ambient light} = K \times (\text{relative luminance})/((\text{exposure time}) \times (\text{gain}) \times (\text{reflectance}))$$

where K is a proportionality constant.

3. The system of claim 2, wherein the occupancy detector comprises:
   a reflectance estimator that estimates the reflectance of the ROI with the object according to the following relationship provided that the ambient light, the exposure time and the gain of the image sensor are kept the same while capturing the image:

$$(\text{relative luminance/reflectance}) \text{ without object} = (\text{relative luminance/reflectance}) \text{ with object}.$$

4. The system of claim 2, further comprising:
   a light meter that measures the illumination of the ambient light; and
   a calibration device that receives the image without the object, according to which the proportionality constant K is determined according to the relative luminance of the image, the exposure time and the gain of the image sensor and the reflectance of the object, or (K/reflectance) is determined according to the relative luminance of the image, the exposure time and the gain of the image sensor.

5. The system of claim 1, wherein the occupancy detector comprises:
   a motion detector that detects motion of the object on the ROI.

6. The system of claim 5, wherein the motion detector detects motion of the object according to a difference between a current image and a preceding image captured by the image sensor.

7. The system of claim 5, wherein the status detector determines the existence status of the ROI when triggered by the motion detector that detects the motion of the object.

8. The system of claim 1, wherein the image sensor comprises a visible-light image sensor.

9. The system of claim 1, further comprising:
a light source disposed above the ROI and adjusted according to the estimated illumination of ambient light.

10. The system of claim 1, wherein a specular reflection area having luminance value greater than a predetermined threshold is excluded by the ROI selector while estimating the ambient light.

11. A method of estimating ambient light, comprising:
(a) capturing an image by an image sensor;
(b) determining at least one region of interest (ROI) on the image;
(c) determining existence status of an object disposed on the at least one ROI; and
(d) estimating illumination of ambient light of the at least one ROI according to luminance of the at least one ROI on the image;
wherein the step (c) comprises a step of determining the existence status of the ROI when motion of the object is detected.

12. The method of claim 11, wherein illumination of the ambient light irradiating the object is a function of relative luminance of the image, exposure time and gain of the image sensor and reflectance of the ROI with or without the object, and is expressed as follows:

$$\text{ambient light} = K \times (\text{relative luminance}) / ((\text{exposure time}) \times (\text{gain}) \times (\text{reflectance}))$$

where K is a proportionality constant.

13. The method of claim 12, wherein the step (c) comprises:
estimating the reflectance of the ROI with the object according to the following relationship provided that the ambient light, the exposure time and the gain of the image sensor are kept the same while capturing the image:

(relative luminance/reflectance) without object=(relative luminance/reflectance) with object.

14. The method of claim 12, further comprising:
measuring the illumination of the ambient light; and
receiving the image without the object, according to which the proportionality constant K is determined according to the relative luminance of the image, the exposure time and the gain of the image sensor and the reflectance of the object, or (K/reflectance) is determined according to the relative luminance of the image, the exposure time and the gain of the image sensor.

15. The method of claim 11, wherein the step (c) comprises:
detecting motion of the object on the ROI.

16. The method of claim 15, wherein the motion of the object is detected according to a difference between a current image and a preceding image captured by the image sensor.

17. The method of claim 11, wherein the image sensor comprises a visible-light image sensor.

18. The method of claim 11, further comprising:
providing a light source disposed above the ROI and adjusting the light source according to the estimated illumination of ambient light.

19. The method of claim 11, wherein a specular reflection area having luminance value greater than a predetermined threshold is excluded while estimating the ambient light.

* * * * *